United States Patent [19]
Quick et al.

[11] Patent Number: 4,900,594
[45] Date of Patent: Feb. 13, 1990

[54] PRESSURE FORMED PAPERBOARD TRAY WITH ORIENTED POLYESTER FILM INTERIOR

[75] Inventors: James R. Quick, Warwick; James W. Mitchell, Newburgh, both of N.Y.

[73] Assignee: International Paper Company, Purchase, N.Y.

[21] Appl. No.: 97,763

[22] Filed: Sep. 17, 1987

[51] Int. Cl.⁴ .................... B32B 27/10; B65D 85/00
[52] U.S. Cl. .................... 428/34.2; 156/151; 156/224; 156/272.2; 156/273.3; 156/277; 156/307.3; 156/310; 426/113; 426/127; 426/234; 428/195; 428/458; 428/480; 428/481; 428/537.5; 428/910
[58] Field of Search ........... 428/35, 458, 480, 481, 428/34.2, 537.5, 195, 458, 480, 481, 910; 426/113, 127, 234; 156/224, 273.3, 272.2, 151, 277, 310, 307.3

[56] References Cited
U.S. PATENT DOCUMENTS

| | | | |
|---|---|---|---|
| 3,819,773 | 6/1974 | Pears | 428/483 |
| 4,147,836 | 4/1979 | Middleton | 428/481 |
| 4,214,035 | 7/1980 | Heberger | 428/483 |
| 4,287,274 | 9/1981 | Ibbotson et al. | 428/480 |
| 4,337,116 | 6/1982 | Foster et al. | 428/481 |
| 4,456,164 | 6/1984 | Foster et al. | 428/35 |
| 4,486,483 | 12/1984 | Caines | 428/480 |
| 4,518,651 | 5/1985 | Wolfe, Jr. | 428/481 |
| 4,543,280 | 9/1985 | Fujita et al. | 428/34.2 |
| 4,699,845 | 10/1987 | Oikawa et al. | 428/480 |
| 4,735,513 | 4/1988 | Watkins et al. | 428/34.3 |
| 4,784,708 | 11/1988 | Allen | 525/176 |

Primary Examiner—Ellis P. Robinson
Assistant Examiner—James J. Seidleck
Attorney, Agent, or Firm—Michael J. Doyle

[57] ABSTRACT

An ovenable food tray for cooking foodstuffs, such as frozen foodstuffs, in an oven of either the microwave or conventional type. The tray is formed from a flat, unitary laminate blank by deforming the blank in any conventional male and female die apparatus under pressure and heat. The laminate includes a food contacting PET bi-axially oriented film coating adhered to a paperboard base stock by means of a crosslinkable adhesive. The use of such a coating and such an adhesive formulation permits use of the tray in oven temperatures to about 400 degrees F. without delamination of the coating from the paperboard or cracking of the coating.

18 Claims, 1 Drawing Sheet

PRESSURE FORMED PAPERBOARD TRAY WITH ORIENTED POLYESTER FILM INTERIOR

BACKGROUND OF THE INVENTION

This invention relates to a paperboard tray of the type having a polyester coating or layer on its interior, food contacting surface. Such trays are known and are often formed by extrusion coating a layer of polyethylene terephthalate (PET) resin on a paperboard substrate, no adhesive being required due to the affinity of the PET for the paperboard, the resin being applied as an amorphous (noncrystalline) coating. Thereafter, the flat substrate and its coating are deformed or drawn in a reciprocating die apparatus to the shape of a tray useful as the lower portion of an openable container for prepackaged foodstuffs adapted to be heated in either a microwave or a conventional oven.

Prior art constructions of dual-oven trays of this type relate to extrusion coating with PET as the method of providing the tray stock with a food-contacting coating of heat-resistant plastic. The following U.S. patents discuss this approach: U.S. Pat. Nos. 3,924,013; 4,147,836; 4,391,833 and 4,595,611. This approach has a number of limitations, including: (1) Adhesion of the extruded PET coating can be variable under production conditions, depending on the control of the extrusion coating conditions, the rheology of the molten PET resin, the surface characteristics of the paperboard and other factors. (2) The extruded PET coating is in an amorphous state, and as such can undergo crystallization when heated to conventional oven cooking temperatures and then cooled to room temperature. This gives rise to shrinkage of the coating which causes the trays to warp. Further, the crystallized coating tends to be brittle and may crack during normal handling of the tray. (3) The extruded PET coating is typically not a high-gloss coating. Printing of the paperboard before extrusion coating, when desired to enhance the appearance of the product, must be done with special inks and may require the use of an additional coating over the printed surface to improve the adhesion of the extruded PET coating such as shown in U.S. Pat. No. 4,595,611.

Because of the shortcomings of tray stock made with an extruded PET coating for the food contacting surface, alternate coatings have been considered by workers in this art, but none of these coatings has fully met the requirements for low-cost, dual-oven food trays produced by the pressure-forming, reciprocating die process.

Prior to the present invention, the inventors attempted to produce tray stock by laminating paperboard with various heat-resistant plastic films, including biaxially-oriented polyester film. This film was considered because it is commercially available, also, it is moderately priced, and it has the heat-resistance and other performance characteristics needed in the food-contacting component of dual-oven tray stock. However, our past efforts to use biaxially-oriented polyester film were unsuccessful because the laminated stock exhibited delamination, either immediately after the trays were formed, or later when the trays were subjected to oven cooking temperatures.

SUMMARY OF THE INVENTION

The present invention provides a method for the manufacture of pressure-formed, dual-oven food trays from a laminated stock made from paperboard and biaxially-oriented polyester film. This method overcomes the problem of delamination described above, which hindered past efforts to use this type of laminated stock. According to the invention, a cross-linkable adhesive is employed to join the biaxially oriented film to the paperboard substrate.

DETAILED DESCRIPTION OF THE INVENTION

Figure 1:
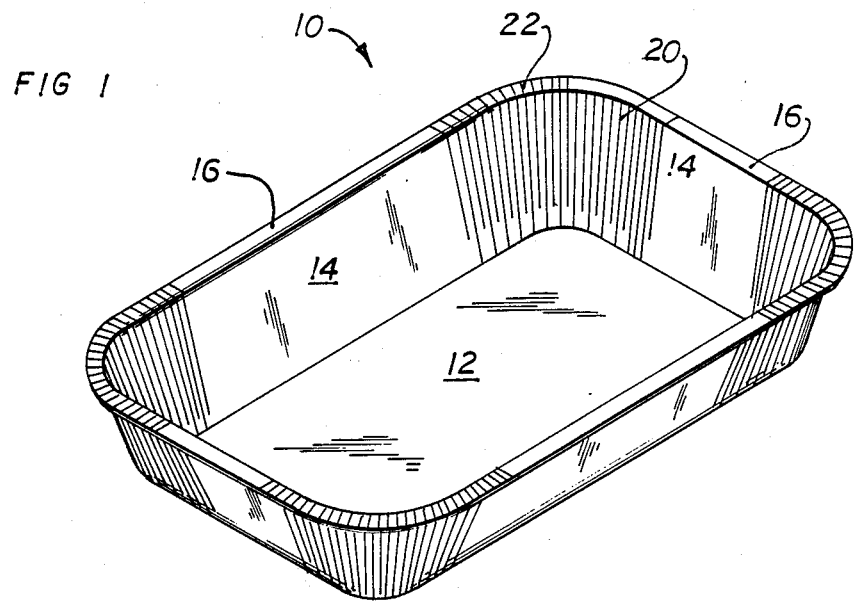
FIG. 1 is a perspective view of the tray of this invention.

FIG. 1 illustrates an ovenable try of this invention, the tray denoted by the numeral 10. The tray has a bottom 12 and side walls 14 and a continuous peripheral flange 16 extending generally outwardly from the upper portion of the side walls. The numeral 20 denotes any one of several score lines at the rounded corners of the tray, with the numeral 22 denoting overlapped portions which extend from the flange partially down the rounded corners toward the bottom 12. The overlapped portions are formed during the process of deforming the blank from which the tray is made.

Figure 2:
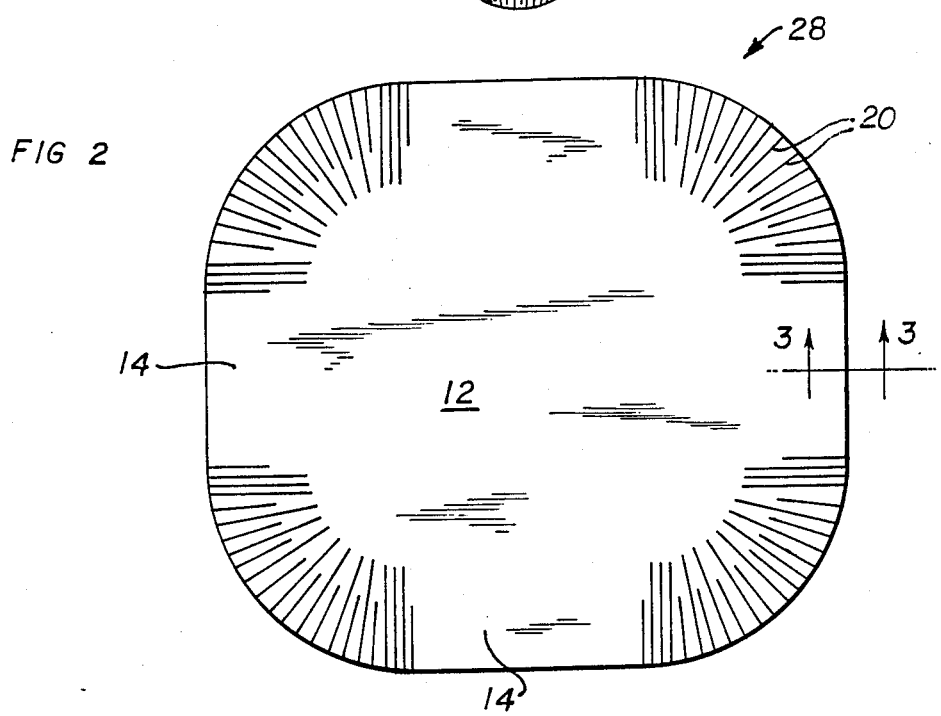
FIG. 2 is a plan view of a flat, one piece cut and scored laminate blank from which the tray of this invention is formed.
Figure 3:
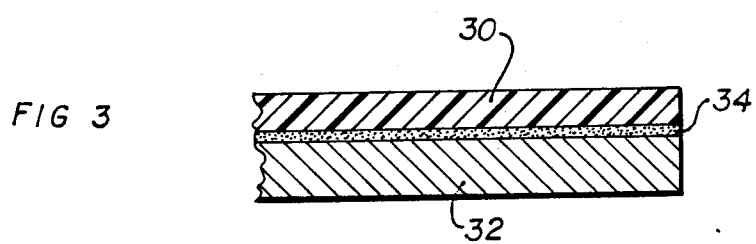
FIG. 3 is a cross section taken along section 3—3 of FIG. 2 and illustrates the several laminate layers of the blank.

In FIG. 2 a unitary, laminated blank is shown prior to its deformation to the tray of FIG. 1 with the biaxially oriented polyester film facing the reader. The scored lines 20 are pressed into the film and into the paperboard base stock by conventional techniques. FIG. 3 shows the film 30 and paperboard base stock 32 joined together by and sandwiching a cross linkable adhesive layer 34. The inside of the tray is thus completely covered by the biaxially oriented film 30 and food is adapted to be placed thereon. The blank 28 is deformed by known pressure forming methods and apparatus into the tray, one such method and apparatus suitable for this purpose being shown in U.S. Patent 4,026,458 and issued to Morris et al. The method includes the steps of placing a flat blank in a deforming die having male and female portions and then moving these two die portions together to thereby deform the blank into the shape of a tray.

The adhesive 34 may be applied separately to each of the film 30 and paperboard stock 32 prior to final lamination. Further, the separately applied adhesive formulations may be of different compositions, as will be described in detail in connection with the specific examples later to be given. Alternatively, the adhesive may be applied to the paperboard only or to the film only.

The following examples are given to further describe the invention.

EXAMPLE 1

A laminated stock was produced from a combination of preprinted paperboard and corona-treated biaxially-oriented polyester film using a combination of two water-based acrylic adhesive formulations. The paperboard base stock was bleached white paperboard of the type commonly referred to as solid bleached sulfate (SBS) paperboard, which is well known as a base stock for food packaging materials. The particular paperboard used here was uncoated milk carton stock with a thickness of 0.0235 inch and weighing 282 lbs. per 3,000 sq. ft. This paperboard base stock was preprinted on one side with a red pattern corresponding to the rim area and sidewall area of the trays that would subsequently be formed from the laminated stock. The ink was a conventional water-based flexographic ink with a low wax content and the printing was done on a standard flexographic press. The biaxially oriented polyester film was a commercial film MYLAR(TM) 48LBT from the DuPont Co. This polyester film is 0.00048 inch in thickness and has a corona discharge treatment on one surface for improved adhesive bonding. The lamination process was run on a conventional wet-bond laminating machine with adhesive stations for applying adhesive to both the paperboard and the film. Adhesive was applied to the printed side of paperboard with a 110 line gravure roll applicator delivering about 3 lbs of wet adhesive per 1,000 sq. ft. of paperboard. Adhesive was applied to a corona-treated side of the film with a smooth roll applicator delivering about 1.5 lbs. of wet adhesive per 1,000 sq. ft. of film. The following adhesive formulations were used.

| Adhesive Applied to Paperboard | |
|---|---|
| RHOPLEX TM N-1031 acrylic latex from Rohm & Haas Co. | 200 lbs. |
| Foamaster NXZ defoamer from Diamond Shamrock Chemical Co. | 1.5 oz.* |
| (*predispersed in an equal volume of water) | |
| Adhesive Applied to Film | |
| RHOPLEX TM N-1031 acrylic latex from Rohm & Haas Co. | 375 lbs. |
| Cymel TM 325 melamine-formaldehyde crosslinking agent | 11.5 lbs. |
| Isopropyl alcohol | 11.5 lbs. |
| Water | 23 lbs. |
| – (3 components listed immediately above were premixed before combination with the acrylic latex) | |
| Foamaster NXZ defoamer from Diamond Shamrock Chemicals Co. | 3 oz.** |
| (**predispersed in an equal volume of water) | |

The laminating process was run with the paperboard and the film running simultaneously through the respective adhesive application stations, and then the paperboard and film were both run directly into a laminating nip where the two adhesive-coated surfaces were joined with the adhesive still moist on both surfaces. The laminating machine was run at 300–350 feet per minute. The laminated stock was run from the laminating nip into a hot air oven with an air temperature of 400° F. Residence time for the laminated stock in the oven was about 5 seconds. Following the oven, the laminated stock was run over a chill roll and then rewound into a finished roll.

Laminated stock produced in the manner just described was converted to trays using the known procedures, such as described in U.S. Pat. No. 4,026,458 the resulting trays were used to cook food items such as chicken pieces and fish fillets in a conventional electric oven at oven temperatures in the range of 350°–400° F. These trays performed satisfactorily in the cooking tests without delamination of or blistering of the film.

EXAMPLE 2

A laminated stock was produced from the same combination of preprinted paperboard and corona-treated biaxially-oriented polyester film as described in the preceding example using the same laminating machine, run in the same manner with adhesive applied to both the paperboard and the film, but in this case the same adhesive formulation was run on both adhesive application stations. The adhesive formulation was the same as that applied to the film in the preceding example, i.e., the formulation containing the melamine-formaldehyde crosslinking agent.

The laminated stock of this example was formed into trays and tested in the same manner as the stock of Example 1. These trays also performed satisfactorily, demonstrating good integrity and overall heat-resistance in the oven cooking tests.

EXAMPLE 3

A laminated stock was produced from a combination of preprinted paperboard and biaxially-oriented polyester film with a coating on one surface to provide improved adhesive bonding. The preprinted paperboard was the same as that used in the two preceding examples. The biaxially oriented polyester film was a commercial film, MELINEX(TM) 814 from ICI Americas, Inc. This polyester film is 0.0005 inch in thickness. The chemical nature of the adhesion-promoting coating is not disclosed by the supplier. This lamination process was run with the adhesive applied only to the paperboad, using a 110 granure roll applicator delivering about 3 lbs. of wet adhesive per 1,000 sq. ft. of paperboard. In this case the adhesive was a water-based polyurethane adhesive. The adhesive formulation was as follows:

| | |
|---|---|
| AS 390 aqueous polyurethane adhesive base from Adhesion Systems, Inc. | 180 lbs. |
| AS 316 catalyst from Adhesion Systems, Inc | 4.4 lbs.* |
| N-580 acrylic latex from Rohm & Haas Co. | 43 lbs. |
| AS defoamer from Adhesive Systems, Inc. | 50 gm. |
| *premixed with an equal amount of water | |

The laminating process was run with the paperboard and the film running into the laminating nip with the moist adhesive-coated surface of the paperboard pressed against the coated side of the polyester film. The laminating machine was run at about 500 feet per minute. The laminated stock was run from the laminating nip into a hot air oven with an air temperature of 400° F. Residence time for the laminated stock in the oven was about 3 seconds. Following the oven the stock was run over a chilling roll and then rewound into a finished roll.

The laminated stock manufactured in the manner just described was converted to trays in the same manner as in the preceding examples and tested with typical frozen food items in a conventional electric oven with oven temperatures in the range of 350°–400° F. The trays passed these cooking tests without any form of failure.

EXAMPLE 4

A laminated stock was produced from a combination of plain (unprinted paperboard and a lightly-metallized biaxially-oriented polyester film using the same laminating method and the same adhesive as in Example 2. The paperboard was the same as the basestock used in the preceding examples, but without the red print pattern. The lightly-metallized polyester film was obtained from the DuPont Co. and was designated as XR 911-C. The use of this film provided a tray stock with a metallic gray color, similar to the color of high quality cookware and thereby offering an esthetic advantage over a tray stock with the obvious appearance of paperboard. The XR-911C film is produced by the well-known process of vacuum metallization, but has a relatively low level of metallization compared to typical metallized films. This film has a transmission optical density of about 0.20–0.25, which is equivalent to a light-transmission value of about 60%.

In the laminating process the adhesive was applied to the metallized side of the film and this was joined to the adhesive-coated side of the paperboard in the laminating nip. Trays were made from the laminated stock of this example via the pressure-forming process used in all preceding examples. These trays were tested in both a conventional electric oven and in a standard domestic microwave oven, using typical frozen food products. Overall performance was entirely acceptable under test conditions representative of consumer end-use conditions.

EXAMPLE 5

A laminated stock was produced from a combination of plain (unprinted) paperboard and a white biaxially-oriented polyester film using the same laminating method as in Example 2, with a commercial water-based vinyl-acetate adhesive applied at both adhesive stations. The paperboard was the same as the base stock used in Examples 1–3, but without the red print pattern. The white polyester film was supplied by ICI Americas, Inc. and was designated as MELINEX(TM) 829. This film was 0.00048 inch in thickness. According to information from the supplier the white color of this film is due to a pigment admixed therein. The adhesive used in this example was AIRFLEX(TM) 421, a water-based vinyl-acetate adhesive formulated with a crosslinking agent. Trays were made from the laminated stock of this example in the manner already described and subjected to general end-use tests like those of the preceding examples. These trays had a very attractive lustrous white appearance because of the use of the white polyester film. The trays exhibited the same highly acceptable performance in end-use performance tests as those of Examples 1–4.

EXAMPLE 6

A laminated stock was produced from a combination of plain (unprinted) paperboard and a reverse printed biaxially-oriented polyester film using the same laminating method and adhesive as in Example 2. The paperboard was the same as that used in Examples 4 and 5. The reverse-printed polyester film was supplied by the Laminating and Coating Division of Jefferson Smurfit Corporation. This film was about 0.0005 in thickness and had full coverage 2-color print pattern. In the laminating process, adhesive was applied to the printed side of the film and this was joined to the adhesive-coaed surface of the paperboard in the laminating nip. Trays were formed and tested in the fashion of the preceding examples with excellent results.

We claim:

1. An ovenable food tray comprising a food contacting inner layer of a biaxially-oriented polyethylene terephthalate and an outer layer of paperboard, said layers secured together by and sandwiching a layer of crosslinkable adhesive including a crosslinking agent, whereby the tray exhibits improved resistance to delamination and cracking upon exposure to oven temperatures to about 400 degrees Fahrenheit.

2. A method of making a paperboard laminate tray including the steps of (1) forming a flat laminate by laminating together a biaxially oriented polyethylene terephthalate resin film and a paperboard base stock by means of a crosslinkable adhesive including a crosslinking agent, and (2) deforming the flat laminate into the shape of a tray.

3. A method of making a flat unitary laminate blank capable of being formed into an ovenable food tray resistant to delamination and cracking upon exposure to oven temperatures to about 400 degrees Fahrenheit, which comprises,
   a. providing a paperboard stock and a film of biaxially-oriented polyester;
   b. applying a cross-linkable adhesive including a crosslinking agent to a surface of the paperboard stock or of the biaxially-oriented polyester;
   c. contacting the adhesive coated surface of the paperboard stock with a surface of the biaxially-oriented polyester or contacting the adhesive coated surface of the biaxially-oriented polyester with a surface of the paperboard stock; and
   d. heating the thus formed laminate at about 400 degrees Fahrenheit.

4. A method according to claim 3, wherein one surface of the paperboard stock is preprinted and the preprinted surface is adhered to the biaxially-oriented polyester.

5. A method according to claim 3, wherein one surface of the biaxially-oriented polyester film is reverse preprinted and the preprinted surface is adhered to the paperboard stock.

6. A method according to claim 3, wherein one surface of the biaxially-oriented polyester film is treated with an electrical discharge to enhance its adhesion to the paperboard stock and the treated surface is adhered to the paperboard stock.

7. A method according to claim 3, wherein one surface of the biaxaially-oriented polyester is metallized to have a color resembling cookware and the metallized surface is adhered to the paperboard stock.

8. A method according to claim 3, wherein the polyester is polytheylene terephthalate.

9. A method according to claim 3 wherein the crosslinkable adhesive is applied both to the paperboard stock and to the biaxially-oriented polyester.

10. A method according to claim 9, wherein the same adhesive is applied to the paperboard stock and to the biaxially-oriented polyester.

11. A method according to claim 9, wherein a different adhesive is applied to the paperboard stock and to the biaxially-oriented polyester.

12. A flat unitary laminate blank capable of being formed into an ovenable food tray resistant to delamination and cracking upon exposure to oven temperatures to 400 degrees F, which consists of a layer of paperboard stock and a layer of biaxially-oriented polyester adhered to each other by means of a cross-linkable adhesive including a crosslinking agent.

13. A flat unitary laminate blank according to claim 12, wherein a surface of the layer of the paperboard stock is preprinted and the preprinted surface is adhered to the biaxially-oriented polyester.

14. A flat uniary laminated blank according to claim 12, wherein a surface of the biaxially-oriented polyester is reverse preprinted and the preprinted surface is adhered to the paperboard stock.

15. A blank as in claim 12, wherein the polyester is polyethylene terephthalate.

16. A blank as in claim 12, wherein the biaxially-oriented polyester is metallized on one surface to have a color resembling cookware and the metallized surface is adhered to the paperboard stock.

17. A blank as in claim 12, wherein the biaxially-oriented polyester contains a white pigment.

18. A method of making an ovenable food tray formed from a paperboard stock and a film of biaxially-oriented polyester, said food tray being resistant to delamination and cracking upon exposure to oven temperatures up to 400 degrees Fahrenheit, which comprises,
  a. applying a cross-linkable adhesive including a crosslinking agent to a surface of the paperboard stock or of the biaxially-oriented polyester;
  b. contacting the adhesive coated surface of the paperboard stock with a surface of the biaxially-oriented polyester, or contacting the adhesive coated surface of the biaxially-oriented polyester with a surface of the paperboard stock , to form a flat laminate;
  c. heating the thus formed flat laminate at about 400 degrees Fahrenheit; and
  d. deforming the flat laminate into the shape of a food tray.

* * * * *